Aug. 25, 1936.    G. W. WALTON    2,052,507
VARIABLE SPEED MECHANISM
Filed July 26, 1935    4 Sheets-Sheet 2

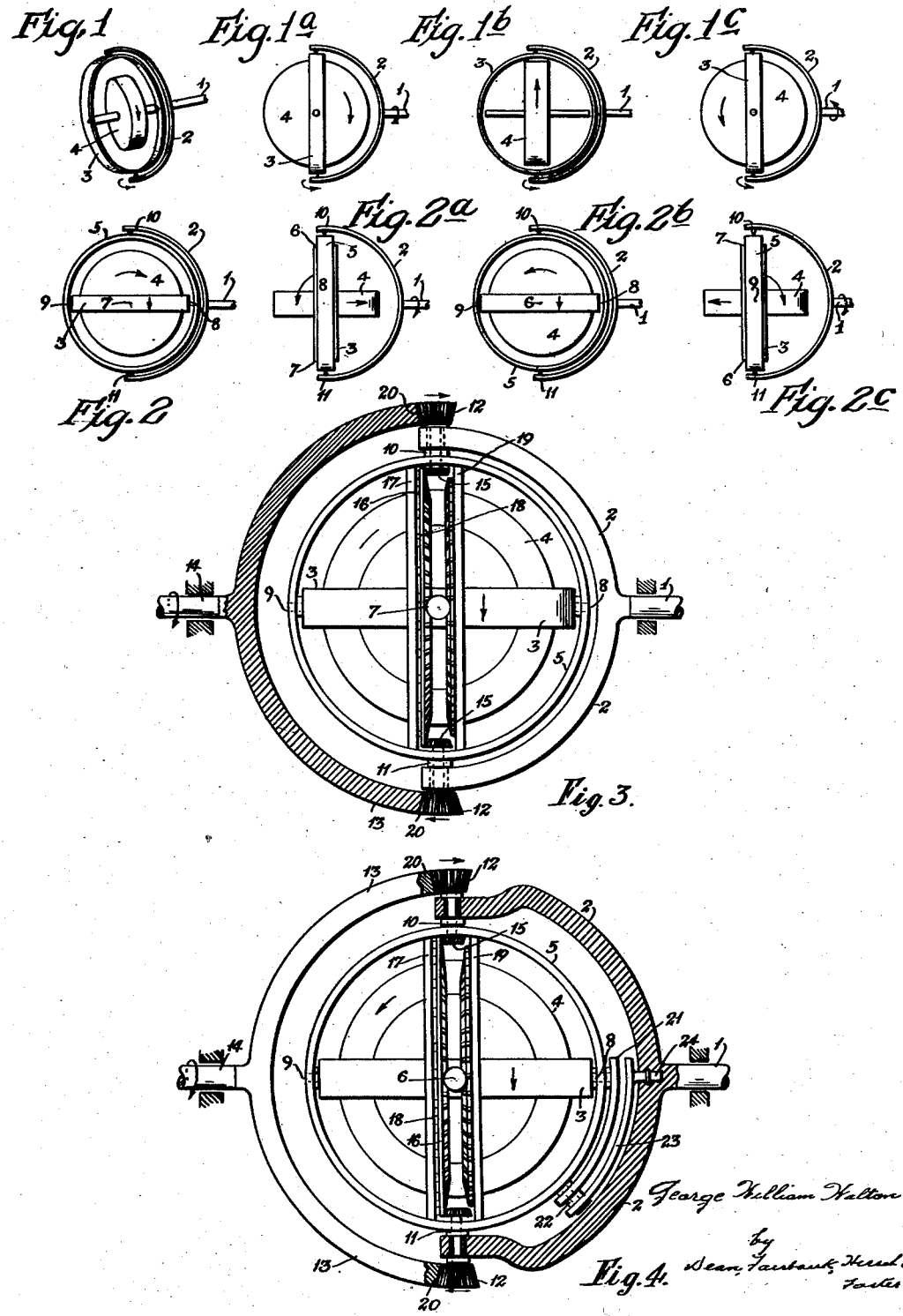

Aug. 25, 1936.  G. W. WALTON  2,052,507
VARIABLE SPEED MECHANISM
Filed July 26, 1935  4 Sheets-Sheet 3

George William Walton
by
Dean, Fairbank, Hirsch
Foster

Aug. 25, 1936.  G. W. WALTON  2,052,507
VARIABLE SPEED MECHANISM
Filed July 26, 1935  4 Sheets-Sheet 4

George William Walton
by
Dean, Fairbank, Hirsch & Foster

Patented Aug. 25, 1936

2,052,507

UNITED STATES PATENT OFFICE 2,052,507

VARIABLE SPEED MECHANISM

George William Walton, London, England

Application July 26, 1935, Serial No. 33,314
In Great Britain May 4, 1934

19 Claims. (Cl. 74—5)

The invention relates to variable speed mechanisms of the type in which the torque transmission ratio varies automatically with the load.

The problem of power transmission by mechanical means in many applications presents a disparity of torque speed characteristics between driving means and driven load which is greatly accentuated when the load varies between wide limits and/or there is need for speed variation on the driven side. The disparity in torque speed characteristics if constant can be overcome by the use of fixed ratio gearing, but when the disparity is changing from moment to moment through a wide range and in an irregular manner great difficulty is met in providing means of efficiently transmitting power. The problem can be more completely appreciated by a consideration of the conditions usually obtaining in actual practice. Sources of mechanical energy vary their power output in one of three ways, namely, constant speed with variable torque, constant torque with variable speed, and variable speed with variable torque, the last being the most common. On the driven side what is usually required is the optimum speed for a given power under varying load conditions, or a constant speed under varying load conditions which entails of course power variation with load. In addition, in both cases control may be desired, i. e. in the first power has to be adjustable and in the second speed must be adjustable.

The object of the present invention is to provide a mechanical power transmission system having the following features:

1. Automatic variation of torque and speed conversion between the driving and driven shafts.
2. Positive drive, i. e. without possibility of slip which involves loss of energy.
3. One or more reservoirs of kinetic energy interposed between the driving and driven shafts.
4. Variation of the level of kinetic energy storage with torque-speed conversion requirements.
5. Oscillatory drive between the driving shaft and the reservoir of kinetic energy or between the reservoir and the driven shaft or both, in order that torque-speed conversion can be accomplished.
6. Control of the ratio of torque conversion by the difference of speed between the driving and driven shafts and/or by the power applied to the driving shaft and the load imposed on the driven shaft.

The present invention in its preferred embodiment involves the employment of gyroscopic forces as a means of applying a driving torque to the driven shaft, the duty of the driving shaft being to maintain the rotation of the flywheel of the gyroscope and also to maintain a precession of the gyroscope.

According to the present invention in one aspect, a variable speed gearing comprises a driving shaft, a driven shaft, a gyroscope having a flywheel capable of executing precessional motion, said gyroscope being mounted on one of said shafts and being constrained to rotate bodily therewith, means drivably connected with the other of said shafts for imparting rotation and precessional motion to said flywheel when one of said shafts is rotated relatively to the other, and means for oscillating said gyroscope about an axis which is other than coincident with or parallel to the axis of the one of said shafts on which it is mounted and also other than coincident with or parallel to the axis of precessional motion, said last-mentioned means serving to render unidirectional the torque impulses applied to said driven shaft by gyroscopic force.

According to the invention in a further aspect, a variable speed gearing comprises a driving shaft, a driven shaft, a gyroscope having a flywheel capable of executing precessional motion about an axis substantially normal to its axis of rotation, said gyroscope being mounted on one of said shafts, and being constrained to rotate bodily therewith, means drivably connected with the other of said shafts for imparting continuous rotations to said flywheel about its own axis and about its axis of precession when one of said shafts rotates relatively to the other, and means for oscillating said gyroscope about an axis substantially normal to both the axis of the one of said shafts on which it is mounted and the axis of precessional motion, the arrangement being such that the duration of a complete oscillation of said gyroscope equals the duration of one revolution of precessional motion of said flywheel.

The invention will be further described, by way of example, with reference to the accompanying diagrammatic drawings, in which Figs. 1, 1a, 1b and 1c are explanatory diagrams of a gyroscope carried by a driven shaft, in four configurations, means for maintaining flywheel rotation and precession being omitted, Figs. 2, 2a, 2b and 2c are explanatory diagrams of a modification, in four configurations, in which the gyroscope can be reversed in order that the torque on the driven shaft shall be unidirectional, Fig. 3 is a part-sectional side elevation of an arrangement of the improved gear, Fig. 4 is a part-sectional side elevation of another arrangement having controlled swinging of the gimbal ring, Fig. 5 is a part-sectional side elevation of an arrangement in which the gimbal ring is oscillated by a driving crank mechanism, Fig. 6 is a side elevation of an arrangement having three gyroscopes, Fig. 7 is an end elevation of a further arrangement having three gyroscopes, Fig. 8 is a sectional side elevation on the line 8—8 in Fig. 7, Fig. 9 is a diagram showing the motion of parts in Figs. 7 and 8, Figs. 10 and 11 are respectively end and side elevations of a detail used in a modification of the arrangement shown in Figs. 7 and 8.

Figure 5:
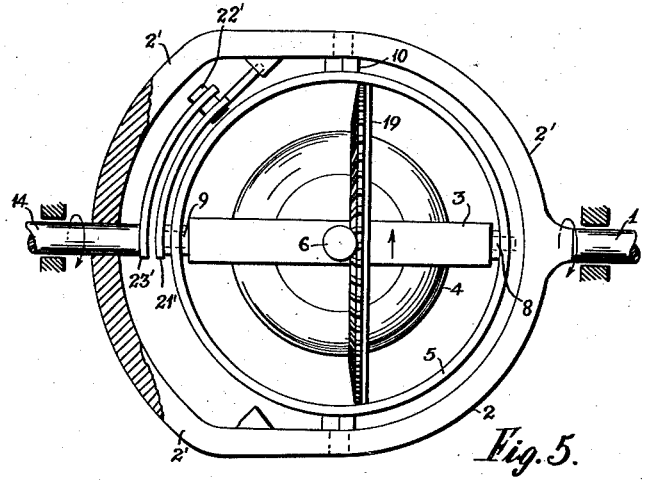

In Fig. 1 a driven shaft 1 has rigidly attached to it a fork or U-piece 2 in which is pivoted a ring 3 free to rotate about an axis at right angles to the axis of the shaft 1. A flywheel 4 has its spindle free to rotate in bearings in the ring 3, the axis of the spindle being at right angles to the axis on which the ring 3 turns in the fork 2. The axes of 1, 3 and 4 cross each other substantially at a common point in the centre of the wheel 4. It will be assumed that the flywheel 4 is driven in the direction shown by the arrow on it, and that the ring 3 is to be rotated about its axis in the direction of the arrow at the bottom of the drawings, by suitable means (not shown). The rotation of the ring 3 about its axis will cause motion of the flywheel 4 which will bring into play a precessional force tending to cause the spindle of the flywheel 4 to rotate end over end in the plane of the ring 3, this movement being prevented by the bearings of 4 in 3, the bearings of 3 in 2 and the bearings of 1. The gyroscopic force exerted depends on the speed of precession and the speed of the mass, and the radius of gyration of the flywheel 4. Figs. 1, 1a, 1b and 1c show consecutive positions of the ring 3. In Fig. 1 the spindle of the flywheel 4 is parallel to the shaft 1; in Fig. 1a the spindle of 4 is at right angles to 1, (i. e. 90° precessional movement from the Fig. 1 position); in Fig. 1b the spindle is 180° from the Fig. 1 position; and in Fig. 1c it is 270° from the Fig. 1 position. In Fig. 1 no gyroscopic force is exerted on the shaft 1 as a torque tending to rotate it on its axis. As the ring 3 moves from position as in Fig. 1 towards position as shown in Fig. 1a, a gradually increasing torque is applied to the shaft 1, tending to rotate it in the direction of the arrow encircling the shaft 1 in Fig. 1a. This torque is, for uniform speeds of 3 and 4, at a maximum in position as shown in Fig. 1a after which it gradually decreases to zero again in position as shown in Fig. 1b. Beyond position as shown in Fig. 1b torque is again exerted on the shaft 1, attaining a maximum at position as shown in Fig. 1c and decreasing to zero again at position as in Fig. 1; but the torque between positions in Fig. 1b and Fig. 1 is in the direction of the arrow encircling the shaft 1 in Fig. 1c. As the torque on the shaft 1 in position as shown in Fig. 1a is opposite to that in position as shown in Fig. 1c, the torque is such as to cause the shaft 1 to oscillate about its axis. As the gyroscopic force is constant for constant speeds of the ring and the flywheel 4, the torque in the plane of the ring 3 is also constant; but owing to the rotation of the ring 3, the gyroscopic force tending to rotate the shaft 1 is applied at a changing radius; consequently the torque on the shaft 1 is sinusoidally varied.

The arrangement of Figs. 1, 1a, 1b and 1c does not meet the usual requirements in power transmission mechanisms for what is required is a unidirectional torque on the driven shaft. Some means are therefore required to "rectify" the oscillatory torque, and Figs. 2, 2a, 2b and 2c show how this can be accomplished.

A driven shaft 1 has a fork 2 in which a gimbal ring 5 is mounted by pivots so that the ring 5 is free to swing on an axis at right angles to that of the shaft 1. In the ring 5 is mounted the precession ring 3, which is free to rotate on pivots about an axis at right angles to that of the gimbal ring, and in the precession ring 3 is mounted the flywheel 4, its spindle having bearings in 3 and rotating on an axis at right angles to that of 3. The axes of the parts 1, 5, 3 and 4 meet each other at a common point in the centre of the flywheel 4. The ends of the axes of the parts 5, 3 and 4 are denoted by 10 and 11, 8 and 9, and 6 and 7 respectively, so that the form of the gyrations may be followed through drawings as shown by Figs. 2, 2a, 2b and 2c. It will be assumed that the flywheel 4 and the precession ring 3 are maintained in rotation about their respective axes by suitable means (not shown), the positions in Figs. 2, 2a, 2b and 2c showing 0°, 90°, 180° and 270° of the precessional rotation of the ring 3. In Fig. 2 the flywheel 4 is rotating clockwise and the pivot 7 moves downwards, a gyroscopic force being produced which tends to rotate the gimbal ring 5 about its axis in a direction such that the pivot 7 moves to the left. These motions continue towards the position as shown in Fig. 2a. In the aspect of the device shown in Fig. 2a the precession ring 3 is rotating anticlockwise and the flywheel 4 towards the right, a gyroscopic force being produced which tends to rotate the shaft 1 about its axis in a direction shown by the encircling arrow. From position as shown in Fig. 2a these motions continue to the position shown in Fig. 2b where the flywheel 4 is rotating anticlockwise and the pivot 6 is moving downwards, so that the gyroscopic force tends to move this pivot to the right, i. e. the swing of the gimbal ring 5 about its axis is reversed relative to the swing in position as shown in Fig. 2. The motions shown in Fig. 2b continue to the position shown in Fig. 2c where the precession ring 3 rotates clockwise and the flywheel 4 rotates to the left, i. e., both these motions are reversed relative to those in position shown in Fig. 2a; consequently the gyroscopic force in position shown in Fig. 2c is in the same direction as in position shown in Fig. 2a, tending to rotate the driven shaft 1 about its axis in the same direction, as shown by the arrow encircling this shaft.

Thus between positions shown in Figs. 2a and 2c the gyroscope has turned completely over by swinging about the axis of the gimbal ring 5, being in the middle of the swing in position as in Fig. 2b. Similarly between positions as shown in Figs. 2c and 2 the gyroscope turns completely over by swinging about the axis of the gimbal ring 5 in the opposite direction. From this it will be apparent that the swinging about the axis of the ring 5 is oscillatory, the angular velocity being zero in positions as shown in Figs. 2a and 2c and maximum in positions shown in Figs. 2 and 2b. The torque on the shaft 1 is maximum in the device as shown in Figs. 2a and 2c positions and minimum in the device as shown in Figs. 2 and 2b positions, and in positions of precession intermediate to the positions shown in Fig. 2. The gyroscopic force has a component tending to rotate the shaft 1 as in positions shown in Figs. 2a and 2c and another component tending to swing the gyroscope about the axis of the gimbal ring 5 in one or the other of the directions as shown in drawings in Figs. 2 and 2b.

Fig. 3 shows an arrangement for driving the flywheel and the precession ring. The driven shaft 1 is coaxial with a driving shaft 14, both running in suitable bearings. In the end of a fork 2, rigidly carried by the end of the shaft 1, is mounted a gimbal ring 5 by pivots 10 and 11. In this ring is mounted a gyroscope comprising a flywheel 4 and a precession frame 3. The precession frame 3 is mounted on pivots 8 and 9. In the precession frame 3 is mounted the flywheel 4 on a spindle with bearings in the frame 3, one end of the spindle, which projects through the frame 3 carrying a bevel pinion 7. The pinion 7 meshes with a bevel gear ring 16 which is free to rotate parallel to a ring 17 which is rigidly fixed to the gimbal ring 5. The members 16 and 17 form races for a thrust bearing having a set of balls 18. With the gear ring 16 also meshes one or two bevel pinions 15 each fixed to a short spindle which passes through the pivots 10 and 11 and therefore through the gimbal ring 5 and the fork 2, an external bevel pinion 12 being fixed to each short spindle. With the pinions 12 meshes a bevel gear ring 20 which is carried by a cup shaped member 13 rigidly mounted on the driving shaft 14. The member 13 may be a suitable form of spider.

With the flywheel pinion 7 also meshes a gear ring 19 rigidly fixed to the gimbal ring 5. The flywheel pinion 7 is of such a size that when it is opposite the pinions 15 it clears the latter, the gear ring 16 being broad faced in order that the pinions 7 and 15 can mesh with it.

The operation of the arrangement of Fig. 3 is as follows. It will be assumed that the shaft 14 is rotated at a uniform speed by a prime mover or motor. If the driven shaft 1 is loaded, its rotation will be resisted, so that the pinions 12 are rotated by the movement of the gear ring 20. The pinions 12 rotate the pinions 15 which, being meshed with the gear ring 16, rotate the latter. The rotation of the gear ring 16 causes the pinion 7 to roll on the gear ring 19 so that the flywheel 4 is rotated and the precession frame 3 rotates at half the speed of the gear ring 16, i. e. flywheel and precessional rotations are maintained by the rotation of the shaft 14 relative to the shaft 1, and gyroscopic forces are produced which will tend to rotate the shaft 1 as described in connection with Fig. 2. Fig. 3 shows a position of the gyroscope corresponding to Fig. 2b in Fig. 2, the reference numbers being the same. If shaft 14 rotates in the direction shown by the encircling arrow, the torque on the driven shaft 1 is at a maximum when the speed of this shaft is a minimum. As the speed of the driven shaft 1 increases, the difference of speed between the driving and driven shafts decreases, consequently the speeds of the flywheel 4 and the precessing frame 3 decrease also so that the gyroscopic forces and therefore the torque on the driven shaft are reduced. It will be apparent that the gyroscopic force and therefore the torque on the shaft are proportional to the square of the speed of shaft 14 relative to that of shaft 1, for if S is the speed of shaft 14 and $s$ the speed of shaft 1, the speed of the precession frame 3 about its axis is $r(S-s)$ where $r$ is the gear ratio between the parts 14 and 3. The speed of the flywheel 4 is directly proportional to that of the precession frame 3, and therefore is $R(S-s)$ where R is the gear ratio between the parts 14 and 4. As the gyroscopic force is proportional to the speed of the flywheel 4 and also to the speed of the precession frame 3, it is proportional to $$r(S-s) \times R(S-s) = Rr(S-s)^2$$

Should the load on the driven shaft be too great the driving shaft will continue to rotate, i. e. if it is driven by a motor the latter will not "stall" and the driving torque will be applied to the driven shaft even if the load prevents rotation. Furthermore should the load be of such a nature that, despite the power applied to the driving shaft, the driven shaft tends to rotate in the wrong direction (e. g. a motor-car on a steep hill tending to move backwards), the torque on the driven shaft will be increased. This occurs because flywheel and precessional speeds are increased for they depend on the difference in speed between driving and driven shafts i. e.

$$[S-(-s)] = S+s$$

The result of this is that a strong braking action is applied to the driven shaft tending to stop or minimize the reverse rotation.

Again suppose for some reason that the driven shaft rotates faster than the driving shaft in the same direction, (e. g. a motor-car running downhill), then it is equivalent to the driving shaft rotating in the reverse direction, and therefore flywheel and precession movements are reversed and apply a torque to the driven shaft in a direction tending to reduce the excessive speed of the driven shaft, i. e. a powerful braking action is applied to the driven shaft. It will also be apparent that when driving and driven shafts are rotating at the same speed in the same direction the flywheel and precessional movements are zero, i. e. $S=s$, therefore $S-s=0$ and no torque produced by gyroscopic action is applied to the driven shaft, any power transmission being only due to friction.

In Fig. 4 which is a modification of Fig. 3, the swinging of the gimbal ring 5 is controlled by a link motion 21 and 23. The pivot pin 8 of the precession frame 3 is rigidly fixed to the link 21. The link 21 is coupled to the link 23 by a pivot 22, the axis of 22 being at a suitable angle to the axis of the precession frame 3 (i. e. 8—9) for the amount of swing required. If the gimbal ring 5 is to swing backwards and forwards through 180°, then the axis of the pin 22 is at 45° to the axis of the frame 3. The link 23 is rigidly fixed to a stub shaft 24 which is coaxial with the shaft 1, and is free to rotate independently of that shaft in a bearing in its end. As the frame 3 rotates it carries with it the link 21 which (with the exception of the position shown in Fig. 4 which is a "dead centre") applies through the pin 22 a force to the link 23 tending to rotate the stub shaft 24 in the same direction as shafts 14 and 1. In the configuration where the frame 3 has rotated 90° from the position shown in Fig. 4, the axis of the frame 3 is normal to the plane of Fig. 4 and the links 21 and 23 are end to end. After 180° rotation of the frame 3 the position is that of Fig. 4, except that the pivots 6 and 7 are reversed and the links 21 and 23 lie with the pin 22 towards the top of the drawing. The gyroscopic force tending to rotate the gimbal ring 5 on its axis 10—11 is at a maximum in the position shown in Fig. 4, and again in a position when the precession frame 3 has moved 180°; consequently the swinging of the ring 5 is carried through the dead centre positions of the links 21 and 23. By means of these links the gyroscopic force tending to swing the gimbal ring 5 also tends to drive or accelerate the rotations of the parts 3 and 4, through parts 6, 16, 15, 12 and 20, also to accelerate the shaft 14 and through gears 6 and 19 to drive the shaft 1 in the desired direction.

A link motion such as is shown in Fig. 4 can be used to couple the driving shaft to the flywheel and precessional motions as shown in Fig. 5. In this example the driving shaft 14 has a bearing in the part 2' which is rigidly fixed to the driven shaft. Attached to the shaft 14 is the link or crank 23' which is coupled by the pivot 22' to the link 21', which in turn is fixed to the precession frame 3 by the pivot pin 9. It must be borne in mind that the gimbal ring 5 swings and therefore the pivot 9 rotates oppositely to the shaft 14. As the precession frame 3 rotates, the pinion 6 rolls around the bevel gear ring 19 which is rigidly fixed to the ring 5 and therefore the flywheel 4 is also rotated.

The arrangement of Fig. 5 allows a swing of the gimbal ring 5 through 180°, but this swing may be made more or less by the use of different lengths of links 23' and 21', but the links 23' and 21' should subtend equal angles at the centre of the flywheel 4 and the axes of the parts 14, 22' and 9 should at all times pass through that centre. Alternatively, if the pivot 22' is free to slide in a slot in the link 23' and/or in the link 21' these links may subtend different angles and pivots 9 and 8 can then be not coaxial with the shafts 14 and 1 in the aspect shown in Fig. 5; this arrangement gives some advantage in the dead-centre position when the ring 5 swings through the axis of the shaft 14, i. e. the position shown in Fig. 5.

The dead-centre position as shown in Fig. 5 presents a difficulty not present in the dead-centre position shown in Fig. 4, owing to the fact that in the former the link 23' conveys the drive whilst in the latter the link 23 is idling. The effect of this in Fig. 5 is to cause the precession frame 3 to rotate in the same direction as the shaft 14 without any swinging of the gimbal ring 5. A method of overcoming the difficulty is to extend the link 21' in Fig. 5 beyond the pivot 22' so that it strikes the part 2'. The action then is as follows, assuming that the position shown in Fig. 5 is being approached. The pivots 22' and 9 rise towards the plane of Fig. 5, and as they enter that plane the extension of the link 21' comes in contact with the part 2 or with a projection thereof on the arm carrying the pivot 10. The drive tends to move the pin 22' upwards, and because the extension of the link 21' is prevented from moving at the point of contact with the part 2', that point acts as a fulcrum and the pivot 9 is forced upwards through the dead-centre. When the shaft 14 has rotated 180° from the position shown in Fig. 5, the extension of the link 21' comes in contact with the arm of the part 2 carrying the pivot 11, the pin 22' is moving downwards so that the pivot 9 is forced down through the dead-centre. In this manner the precession frame 3 is prevented from rotating in the wrong direction and the gimbal ring 5 is compelled to swing. The points where the extension of the link 21' makes contact with the part 2 may be cushioned, for instance by making the projections on the part 2' elastic; or the extension of the link 21' may be springy or have a spring attached to it; or both the extension of the link 21' and the projections on 2' may be sprung. Yet again, the extension of the link 21' and/or the projections on the part 2' may be cam formed to obtain a suitable rolling contact.

In order that the momentum of the precession frame 3 about its axis shall not give a shock to the link system 21', 22' and 23' in the dead-centre position, the link 21' may be arranged to move freely through a small angle on the pivot 9 with or without a spring coupling between them.

The methods described above in which extensions of the link 21' are provided may also be applied to the form of gear shown in Fig. 4, if desired.

Figure 6:
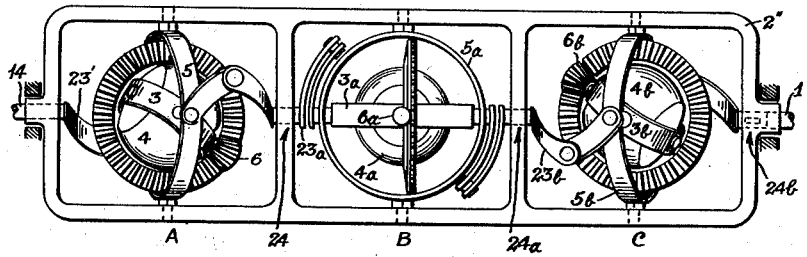

The arrangements of Figs. 4 and 5 may be combined, i. e. the pivots 8 and 9 may each have a crank 21 fitted to them, the crank 23 coupled to the pivot 9 driving and that coupled to the pivot 8 idling on a shaft 24. This arrangement is useful in constructions having more than one gyroscope, as shown in Fig. 6, where the shaft 14 drives the first gyroscope A and the shaft 24, this shaft is the driving shaft of the second gyroscope B and its shaft 24a and the shaft 24a is the driving shaft of the third gyroscope C. The gyroscopes A, B and C are phase displaced, i. e.. the instantaneous positions of the precession ring 3 are displaced, preferably as in Fig. 6 by 120°. This arrangement applies a more uniform torque to the driven shaft 1. The phase displacement in Fig. 6 is obtained by the relative displacement of the cranks 23', 23a and 23b around the axis of the shaft 1, but it is also possible to obtain it by displacement of the axes of the gimbal rings 5, 5a and 5b around the axis, the cranks 23', 23a and 23b being without displacement. In the latter case the top and bottom of the part 2" may have the form of helices around the axis of 1, or the part 2" may be a cylinder.

Any number of gyroscopes may be used in tandem as in Fig. 6, and the drive need not be by cranks but may be by bevel gear rings as in Fig. 3 or 4, the rings being carried by a frame attached to the driving shaft 14 running outside of the part 2" of Fig. 6.

Any number of independent gyroscope units such as are shown in Figs. 3, 4, 5 or 6 may be arranged in tandem, the driven shaft of the first being the driving shaft of the second, and the driven shaft of the second being the driving shaft of the third, and so on. Such an arrangement in powerful transmission systems according to the invention has useful starting characteristics, and is of advantage where the driving shaft rotates at high speed, and a more or less permanent speed reduction is required, e. g. with turbine drives.

Figure 7:
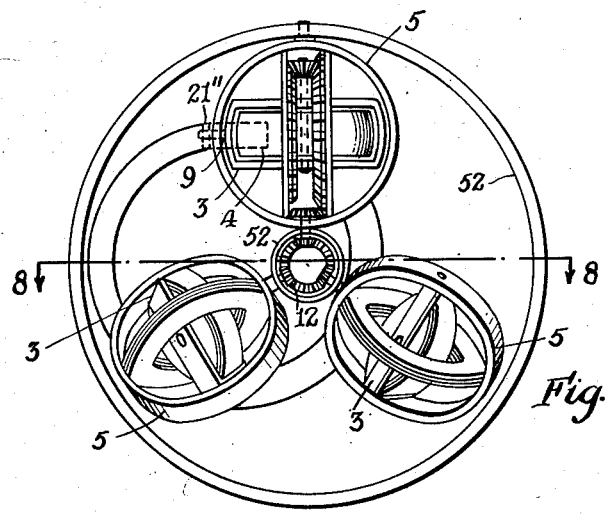
Figure 8:
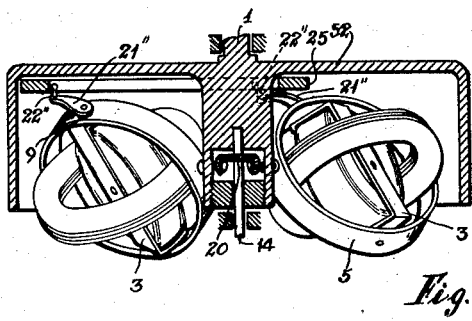
Figure 9:
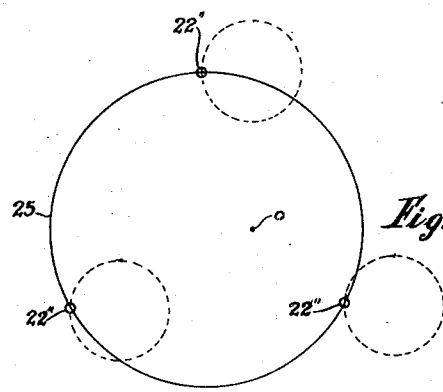

Instead of the axial distribution of Fig. 6 a multiple unit may be arranged radially as in Figs. 7 and 8, where the gyroscopes are mounted in the annular space of a drum 52 fixed to the driven shaft 1. The gimbal rings 5 swing on axes at 120° to each other, and the phase relations of the precession frames 3 are maintained by the cranks 21" fixed to the pivots 9 of the precession frames 3, the free ends of the cranks having universal pivots 22" (e. g., ball and socket) running in bearings 120° apart in a ring 25. The ring 25 serves instead of cranks 23 and idler shafts 24 as shown in previous drawings, and moves with an eccentric motion as shown in Fig. 9, where the dotted circles show the paths of the universal pivots 22", 0 being the axis of the shaft 1. The driving shaft 14 carrying the bevel wheel 20 engaging with the bevel pinions 12 drives the flywheels 4 and precession rings 3 as described in connection with Fig. 3. Any number of gyroscopes and arrangements of gyroscopes, it will be seen, might be used.

Figure 10:
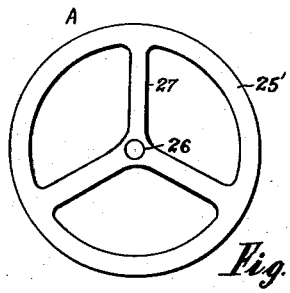
Figure 11:
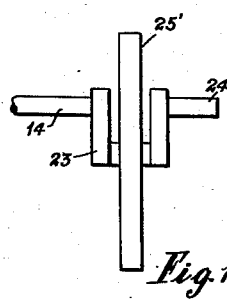

In a modification of the arrangement of Fig. 7 the ring 25 may be used as the drive in the same manner as in Fig. 5. In such a case the ring 25 may be on the opposite side of the gyroscopes, i. e. on the same side as the shaft 14 in Fig. 8. Figs. 10 and 11 show a ring 25' for this purpose, which has the form of a wheel having a central hole 26 and spokes 27. A crank 23 on the driving shaft 14 has its crank pin engaged in the hole 26, the end 24 running in a bearing in the shaft 1 and being co-axial therewith. The radius of the crank 23 should be equal to the radius of the dotted circles in Fig. 9, i. e. the radius of 21" plus sufficient to allow for the universal bearings shown in Fig. 8.

Instead of the ring 25' in Figs. 10 and 11, a spider consisting of a suitable number and distribution of spokes 27 is equally effective, and instead of the crank 23 an eccentric may be used.

It is to be understood that different arrangements of the various elements and mechanisms herein described may be resorted to, and further that any number and arrangement and disposition of gyroscopes may be had, in accordance with the teachings herein, and obvious modifications or variations thereof.

In all the arrangements so far described, except that in Fig. 3, the drive is positive, that is to say the driven shaft tends to rotate when the driving shaft is rotating either in the same or the opposite direction, according to design. In Fig. 3 there is a tendency for the whole gyroscope unit to rotate on the axis of the gimbal ring 5, for the movements of the gimbal ring are without control. Owing to the friction of the bearings 10 and 11 and possibly air resistance the bevel gear ring 16 will begin to rotate, thereby starting precessional and flywheel rotations, and so bring the gyroscopic forces into action, but when this occurs it is by no means certain which way the driven shaft will rotate relative to the driving shaft, though the general tendency would be that they should rotate in the same direction. For this reason it is preferable that the swinging of the gimbal ring be controlled to eliminate the possibility of self reversal of the direction of drive, and for the still further reason that, when a multiple gyroscope unit is used, the phase relations between the gyroscopes shall be maintained to obtain a more uniform driving torque.

In many cases it is desirable to disconnect the drive, i. e. to stop the driven shaft by removing the torque on it whilst the driving shaft continues to rotate. This can of course be accomplished in the usual way by introducing a clutch in the driven or driving shaft, but it can be very readily obtained by stopping the precessional motion or the rotation of the flywheel or both.

Stopping precession is preferable where it is desired to obtain a quick start of rotation of the driven shaft, for there is no need to accelerate the flywheel. The arrangements of Figs. 4 and 7 lend themselves to this method, whilst those of Figs. 5 and 6 can be more readily arranged to stop the flywheel whilst maintaining the precessional motion.

In Fig. 5 the gear ring 19 can be replaced by a gear ring similar to 16 together with the fixed ball race 17 and ball bearings 18 as in Fig. 4. In such a case the driving shaft maintains the rotation of the precession frame 3 on its axis and the swinging of the gimbal ring 5, but the bevel pinion 6 on the spindle of the flywheel 4 rotates the bevel ring 16, and, provided the friction of rotation of 16 is low, the flywheel 4 will not rotate, consequently no gyroscopic forces are applied as a torque to the shaft 1. To engage the drive all that is necessary is to prevent the gear 16 from rotating by such means as dogs or a brake. Alternatively, in Fig. 5 the bevel gear ring 19 may be arranged so that it can be moved out of mesh with the pinion 6 by bodily movement in the direction of the axis of the part 3 towards the pivot 8, thereby disconnecting the drive as the flywheel 4 cannot be driven; meshing of gears 19 and 6 re-engages the drive.

Mechanisms for effecting these engagements and disengagements are simple and may operate through holes in the pivots 10 and 11 between a system of levers mounted on the ring 5 and also on the part 2 the latter being operated by a sliding collar on the shaft 1. Examples of this are described with reference to Fig. 12.

Figure 12:
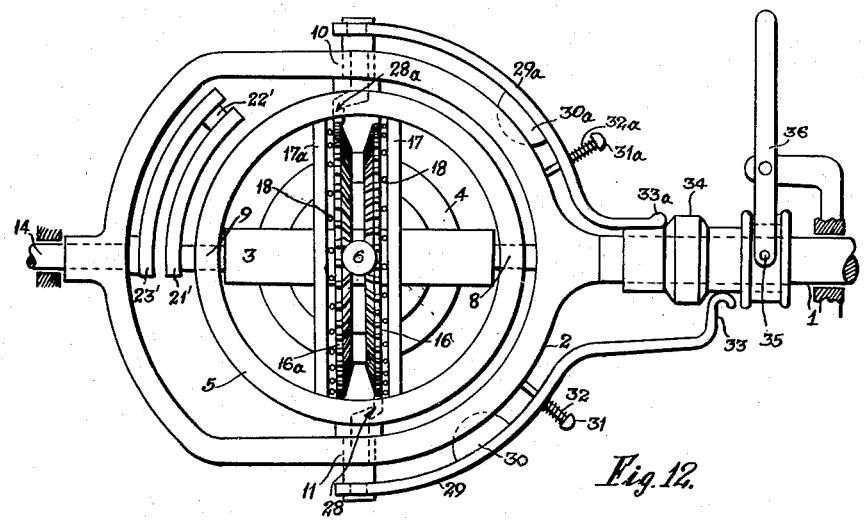
Fig. 12 is a side elevation of a modification yielding forward and reverse drives.

The same methods may be used in the arrangement shown in Fig. 5, to bring into action a reverse drive as shown in Fig. 12. The drive is as in Fig. 5 by means of the crank 23' the pivot 22' and the link 21' to the precession ring 3. Instead of the single fixed bevel gear ring 19 the arrangement on both sides of the bevel pinion 6 is as on the left in Fig. 4, i. e. on each side there is a unit consisting of a fixed ring 17 or 17a, and a moving bevel gear ring 16 or 16a with the ball bearing 18 between them. If both bevel gear rings 16 and 16a are allowed to rotate with the rotation of the precession ring 3, the flywheel 4 will not rotate on its spindle, as pinion 6 will not be rotated. If one bevel gear ring 16 is prevented from rotating by means of a brake, clutch or dog, the driven shaft will rotate in the same direction as the driving shaft; if the other bevel gear ring 16a is prevented from rotating, a reverse drive will be obtained. Such an arrangement may serve as a clutch as well as a means of reversing the motion of the driven shaft.

The gear ring 16 is prevented from rotating by a dog or brake 28 having a stem passing through pivot 11 and rotatable in the lever 29 e. g. a groove in the stem of the dog 28 accommodates a slotted end of the lever 29. The lever 29 has a pivot 30 in a slot in the part 2' about which it can rock, and the end 33 of the lever 29 rests on a collar 34 on the shaft 1, this collar being movable along the shaft by means of the yoke 35 and hand lever 36. When the collar 34 is moved to the right its enlarged portion pushes the end 33 away from the shaft 1 against the pressure of a spring 32 on a bolt 31 fixed to the part 2'. This movement forces the dog 28 in contact with the gear ring 16, so preventing the latter from rotating. Similarly the gear ring 16a can also be prevented from rotating by the dog 28a and the lever 29a, by moving the collar 34 along the shaft to the left. In Fig. 12 the lever 38 is in such a position that the gear rings 16 and 16a are free to rotate so that no drive is transmitted to the shaft 1; moving the collar 34 to the right gives a forward drive, and moving it to the left gives a reverse drive.

Instead of the arrangement of Fig. 12 the arrangement of Fig. 5 may be used with a second non-rotatable gear ring 19 on the other side of the pinion 6, both rings 19 being spaced apart so that neither, or only one is in mesh with 6. By moving both rings 19 together or separately in a direction parallel to the axis of the shaft 1 the drive can be engaged for forward or reverse rotation or completely disengaged.

Figure 13:
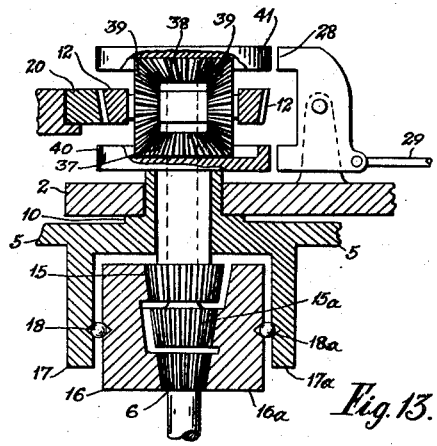
Fig. 13 is a section of a detail of a further form yielding forward and reverse drives.

When the precession is obtained and the flywheel is driven as in Figs. 4 and 7 by means of pinions 12 and bevel gear 20, disconnecting and reversing the drive may be accomplished by any arrangement having two rotatable gear rings as in Fig. 12 where it is arranged that one ring can be prevented from rotating whilst the other ring continues to be driven. An example of this will be described with reference to Fig. 13 which shows only the drive of the two rings 16, and a partial section about one pivot 18 of the gimbal ring 5. The portion 2 is rigidly fixed to the driven shaft, and the parts 17 and 17a are sections of rings fixed to the gimbal ring 5 as in Fig. 4. The drive to the bevel gear rings 16 and 16a is by means of the bevel pinions 15 and 15a respectively, the shaft of 15a running in an axial bore in the shaft of 15. Pinions 15 and 15a are rigidly fixed by means of their shafts to bevel wheels 37 and 38 respectively, the latter two forming a differential gear drive together with planet bevel wheels 39. The bevel pinion 12 carries the planet wheels 39 on suitable spindles and is driven by the crown wheel 20 as in Fig. 4. Brake drums 40 and 41 are rigidly fixed to the gears 37 and 38 respectively.

When there is no braking on the drums 40 and 41 and when the pinion 12 is being driven by the wheel 20, the pinions 15 and 15a rotate in the same direction at the same speed thereby driving the gear rings 16 and 16a in opposite directions at equal speeds. This causes the flywheel pinion 6 to rotate without any precessional movement, so that no torque is applied to the driven shaft, though the flywheel is rotating. By braking drum 40 by a brake shoe 28 actuated by a control rod 29, the gear ring 16 is prevented from rotating as are also pinions 15 and 37, so that the planet wheels 39 rotate on their spindles as well as rotating with the bevel pinion 12. This causes the pinions 38 and 15a and the gear ring 16a to rotate at twice the speed they rotated when there was no braking of the drums 40 and 41; consequently the flywheel pinion 6 rotates at the same speed but with a precessional motion so that a driving torque is applied to the driven shaft in a corresponding direction. The increase of the speed of the gear ring 16a is necessary to keep the flywheel pinion 6 running at the same speed, and so to prevent violent shocks through sudden changes of the speed of the flywheel.

By braking the drum 41 the gear ring 16a is prevented from rotating and the gear ring 16 rotates at double the speed it had when there was no braking of the drum. Thus the same direction and speed of rotation of the flywheel are maintained, but the precessional motion of the flywheel pinion 6 is now reversed so that the driving torque applied to the driven shaft is also reversed.

The application of braking to the drums 40 and 41 may be as gradual as desired, so that the torque applied to the driven shaft is also gradually applied. It will be apparent that the arrangement serves as a clutch as well as a means of reversing the final drive. It also serves as a brake. It will be assumed that the driven shaft is rotating driving some load possessing inertia, and that the drum 41 is braked to prevent its rotation. The flywheel and the pinion 6 will be rotating at some speed lower than their speed was when the driven shaft was not rotating. By releasing the drum 41 and braking the drum 40, a reversed torque is applied to the driven shaft tending to prevent or reduce speed in the direction the load drives it, consequently the speed of the driven shaft falls whilst the speeds of precession and of the flywheel increase, so increasing the brake effect until the driven shaft comes to rest.

It is here assumed that the driving and driven shafts are rotating in the same direction, as a forward drive. After coming to rest the driven shaft will reverse unless the brake on the drum 40 is released. To a certain extent the braking in this manner is regenerative, for the kinetic energy of the load is transferred to the flywheel.

Many modifications and types of variable speed mechanisms according to the invention are possible and can readily be designed in detail. For instance, instead of toothed gears as described in the examples shown in the drawings, friction gearing may be employed to drive the flywheel and/or to drive the precessional motion. Again the various bearings may be ball, roller, conical, needle or the like to improve efficiency. In the examples described the general arrangement of parts has been kept as nearly as possible similar in order that the essence of the invention shall be readily comprehended, but variations within the scope of the invention are readily apparent. For instance the precession ring 3 in the drawings has been shown pivoted in the gimbal ring 5 driven through the pivot 9 by the spherical linkage cranks 21 and 23 with pivot 22, but this is not the only design possible as will be seen from Fig. 14, which is a variation of the type shown in Fig. 5.

Figure 14:
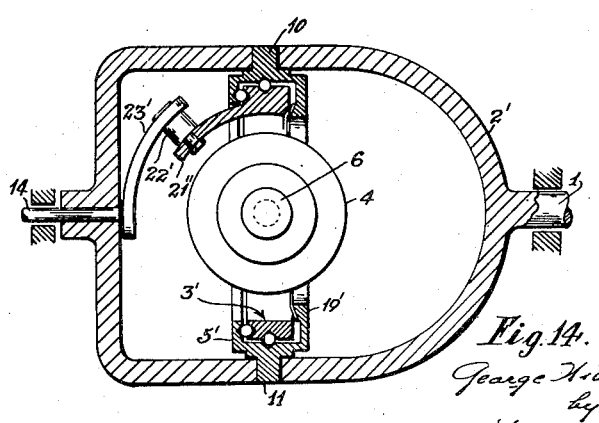
Fig. 14 is a sectional side elevation of a further modification.

In Fig. 14 the gimbal ring 5', the precession ring 3' and the gear ring 19' are concentric, the last being rigidly fixed to the gimbal ring 5' and the precession ring 3' running on ball bearings in the ring 5'. The flywheel spindle has its bearings in the gimbal ring 3', the pinion 6 being inside the ring 3' and engaging with the gear ring 19'. The link 21'' is rigidly fixed to the ring 3' as shown. The action in Fig. 14 is, so far as the invention is concerned, the same as in Fig. 5.

I claim:

1. A variable speed gearing comprising a driving shaft, a driven shaft, a gyroscope having a precession frame and a flywheel journaled therein, means pivotally supporting said gyroscope on one of said shafts and constraining it to rotate bodily therewith, and means drivably connected with the other of said shafts for imparting a continuous rotation to said flywheel and a precessional motion to said precession frame when one of said shafts is rotated relatively to the other, said pivot means permitting said gyroscope to oscillate about an axis which is other than coincident with or parallel to the axis of the one of said shafts on which it is mounted and also other than coincident with or parallel to the axis of precessional motion, and thereby render unidirectional the torque impulses applied to said driven shaft by gyroscopic force.

2. A variable speed gearing comprising a driving shaft, a driven shaft, a gyroscope having a precession frame and a flywheel journaled therein, means pivotally supporting said gyroscope on one of said shafts, said flywheel being capable of executing precessional motion about an axis substantially normal to its axis of rotation, and means drivably connected with the other of said shafts for imparting continuous rotations to said flywheel about its own axis and about its axis of precession when one of said shafts rotates relatively to the other, said pivot means permitting said gyroscope to oscillate about an axis substantially normal to both the axis of the one of said shafts on which it is mounted and the axis of precessional motion, the duration of a complete oscillation of said gyroscope being equal to the duration of one revolution of precessional motion of said flywheel.

3. A variable speed gearing comprising a driving shaft, a driven shaft, a gimbal ring pivotally mounted on one of said shafts and capable of moving about an axis substantially normal to the axis of said one of said shafts, a gyroscope having a precession frame pivotally mounted in said gimbal ring and a flywheel journaled in said frame and capable of executing precessional motion about an axis substantially normal to the axis of motion of said gimbal ring, means drivably connected with the other of said shafts for imparting a continuous rotation and a precessional motion to said flywheel when one of said shafts is rotated relatively to the other, the motion of said gimbal ring serving to render unidirectional the torque impulses applied to said driven shaft by gyroscope force.

4. A variable speed gearing comprising a driving shaft, a driven shaft coaxial with said driving shaft, a gimbal ring, a trunnion whereby said gimbal ring is pivotally mounted on one of said shafts and is movable about an axis normal to the axis of said shafts, a gyroscope having a precession frame pivotally mounted in said gimbal ring and a flywheel journaled in said frame and capable of executing precessional motion about an axis normal to the axis of motion of said gimbal ring, a gear wheel fixed to the other of said shafts, a pinion engaging with said gear wheel, and means including a spindle journaled in said trunnion and on which said gear wheel is mounted, said means serving to impart to said gyroscope at least one of the motions of rotation and precession.

5. A variable speed gearing comprising a driving shaft, a driven shaft, a gimbal ring pivotally mounted on and rotatable about an axis normal to the axis of one of said shafts, a gyroscope having a precession frame pivotally mounted in said gimbal ring and a flywheel journaled in said frame and capable of executing precessional motion about an axis normal to the axis of rotation of said gimbal ring, a gear ring co-axial with the axis of precession, a gear wheel co-axial with and coupled to said flywheel and drivably engaged with said gear ring, and means drivably connected with the other of said shafts for imparting relative motion to said gear wheel and gear ring.

6. A variable speed gearing comprising a driving shaft, a driven shaft, a gimbal ring pivotally mounted on and movable about an axis normal to the axis of one of said shafts, a gyroscope having a precession frame pivotally mounted in said gimbal ring and a flywheel journaled in said frame and capable of executing precessional motion about an axis normal to the axis of motion of said gimbal ring, a gear wheel co-axial with and coupled to said flywheel, a gear ring co-axial with the axis of precession and engaging with said gear wheel, and driving means connected to the other of said shafts for causing said gear wheel to move relatively to said gear ring, and thereby imparting the motions of rotation and precession to said flywheel.

7. A variable speed gearing as claimed in claim 6, wherein said driving means comprises a crown gear attached to said other of said shafts, a trunnion of said gimbal ring, a spindle journalled in said trunnion, a first gear wheel on said spindle engaging with said crown gear, and a second gear wheel on said spindle engaging with said gear ring for rotating the same about the axis of precession of said flywheel.

8. A variable speed gearing comprising a driving shaft, a driven shaft, a gimbal ring pivotally mounted on and movable about an axis normal to the axis of one of said shafts, a gyroscope having a precession frame pivotally mounted in said gimbal ring and a flywheel journaled in said frame and capable of executing precessional motion about an axis normal to the axis of motion of said gimbal ring, a gear wheel co-axial with and coupled to said flywheel, a first gear ring engaging with said gear wheel, a second gear ring co-axial with said first gear ring also engaging with said gear wheel, said gear rings being supported by said gimbal ring and one of said gear rings being rotatable relative to the other, and driving means connected to the other of said shafts for driving one of said gear rings relative to the other.

9. A variable speed gearing comprising a driving shaft, a driven shaft, a gimbal ring pivotally mounted on one of said shafts and movable about an axis substantially normal to the axis of the one of said shafts on which it is mounted, a gyroscope having a precession frame pivotally mounted in said gimbal ring and a flywheel journaled in said frame, means drivably connected with the other of said shafts for imparting a continuous rotation and a precession to said flywheel, and control means operable at will for stopping at least one of said motions of precession and rotation of said flywheel while relative rotation still occurs between said shafts.

10. A variable speed gearing comprising a driving shaft, a driven shaft, a gimbal ring pivotally mounted on and movable about an axis normal to the axis of one of said shafts, a gyroscope having a precession frame pivotally mounted in said gimbal ring and a flywheel journaled in said frame and capable of executing precessional motion about an axis normal to the axis of motion of said gimbal ring, a gear wheel co-axial with and coupled to said flywheel, a first gear ring engaging with said gear wheel, a second gear ring co-axial with said first gear ring also engaging with said gear wheel, both said gear rings being journaled on said gimbal ring for rotation relatively thereto about the axis of precessional motion, control means for locking at least one of said gear rings relative to said gimbal ring and means drivably connected with the other of said shafts for imparting said precessional motion to said flywheel.

11. A variable speed gearing comprising a driving shaft, a driven shaft, a gimbal ring pivotally mounted on and movable about an axis normal to the axis of one of said shafts, a gyroscope having a precession frame pivotally mounted in said gimbal ring and a flywheel journaled in said frame and capable of executing precessional motion about an axis normal to the axis of motion of said gimbal ring, a gear wheel co-axial with and coupled to said flywheel, a first gear ring engaging with said gear wheel, a second gear ring co-axial with said first gear ring also engaging with said gear wheel both said gear rings being journaled on said gimbal ring for rotation relatively thereto about the axis of precessional motion, a differential gear having a driving element and two driven elements, said driven elements being carried by said shaft on which said gimbal ring is mounted, means for causing rotation of said driving element when there is relative motion between said shafts, two further gear wheels meshing respectively with said two gear rings and drivably connected respectively to said two driven elements, and braking means for alternatively arresting said driven elements at will.

12. A variable speed gearing comprising co-axial driving and driven shafts, a gimbal ring carried by one of said shafts on a hollow trunnion and movable about an axis normal to the axis of said shafts, a gyroscope having a precession frame pivotally mounted in said gimbal ring and a flywheel journaled in said frame and capable of precessional motion about an axis normal to the axis of motion of said gimbal ring, a spindle fixed to said flywheel and a bevel flywheel pinion fixed to said spindle, two co-axial radial shafts journalled in said hollow trunnion, two bevel driving pinions on the inner ends of said shafts respectively, two compound bevel gear rings journaled on said gimbal ring for rotation relative thereto about the axis of precession, both meshing with said flywheel pinion, and meshing respectively with said driving pinions, a three-element differential gear having two elements coupled to said radial shafts respectively and the third element coupled to a bevel gear wheel rotatable about an axis normal to the axis of said driving and driven shafts, a crown wheel meshing with said last-mentioned bevel gear wheel and fixed to the other of said driving and driven shafts, and control means operable for locking said radial shafts alternatively.

13. A variable speed gearing comprising a driving shaft, a driven shaft co-axial therewith, a mass carried by one of said shafts and oscillable about an axis normal to the axis of said shafts, and a spherical linkage comprising a crank arm fixed to the other of said shafts and pivoted to a crank arm pivotally connected to said mass, said cranks subtending the same angle at the intersection of said axis and being movable in concentric spherical zones each at a constant radius.

14. A variable speed gearing comprising a driving shaft, a driven shaft, a gimbal ring pivotally mounted on and capable of motion about an axis normal to the axis of one of said shafts, a gyroscope having a precession frame pivotally mounted in said gimbal ring, and a flywheel journaled in said frame and capable of precessional motion about an axis normal to the axis of motion of said gimbal ring, means drivably connected with the other of said shafts for effecting rotational and precessional motion of said flywheel and a spherical linkage comprising a crank arm pivotally connected to said gimbal ring and a crank arm movable about an axis parallel to the axis of the shaft on which said gyroscope is mounted, said arms being pivotally connected together and adapted to move in concentric spherical zones each at a constant radius.

15. A variable speed gearing comprising a driving shaft, a driven shaft, a gimbal ring pivotally mounted on and movable about an axis normal to the axis of one of said shafts, a precession ring pivotally mounted in said gimbal ring and rotatable about an axis normal to the axis of motion of said gimbal ring, a flywheel rotatably mounted in said precession ring, a spherical linkage comprising a crank arm attached to the other of said shafts, and a crank arm journalled in said gimbal ring and drivably connected to said precession frame, said two crank arms being pivoted together and said spherical linkage serving to impart an oscillatory motion to said gimbal ring and to rotate said precession ring, and means for causing rotation of said flywheel.

16. A variable speed gearing comprising a driving shaft, a driven shaft, a plurality of units, each comprising a gyroscope and a pivot therefor as claimed in claim 1, serving to couple said shafts, and means for causing said units to operate with phase displacement relative to one another.

17. A variable speed gearing comprising a driving shaft, a driven shaft, a plurality of units, each comprising a gyroscope and a pivot therefor as claimed in claim 1, serving to couple said shafts, and means for transmitting the gyroscopic force from one of said units to produce precessional movement of a succeeding one of said units.

18. A variable speed gearing comprising a driving shaft and a driven shaft co-axial therewith, a plurality of units mounted on and distributed around one of said shafts, each of said units comprising a gimbal ring movable about a radial axis, and a gyroscope having a precession frame movable about an axis substantially normal to the axis of motion of said gimbal ring and a flywheel journalled in said precession frame, means drivably connected with the other of said shafts for imparting rotation and precession to each of said flywheels, and means cooperating with said units whereby the phases of precessional motion of the several gyroscopes are displaced relatively to one another.

19. A variable speed gearing as claimed in claim 18, wherein each of said precession frames is coupled to a spherical crank journalled in the respective gimbal ring, the crank-pins of all of said spherical cranks being coupled by universal joints to a common connecting element.

GEORGE WILLIAM WALTON.